(12) United States Patent
Ballarin (10) Patent No.: US 8,326,909 B2
(45) Date of Patent: Dec. 4, 2012

(54) ARITHMETIC OR LOGICAL OPERATION TREE COMPUTATION

(75) Inventor: Bruno Ballarin, Juan les Pins (FR)

(73) Assignee: NXP B.V., Eindhoven (NL)

( * ) Notice: Subject to any disclaimer, the term of this patent is extended or adjusted under 35 U.S.C. 154(b) by 878 days.

(21) Appl. No.: 11/722,085

(22) PCT Filed: Dec. 13, 2005

(86) PCT No.: PCT/IB2005/054202
§ 371 (c)(1),
(2), (4) Date: Sep. 9, 2008

(87) PCT Pub. No.: WO2006/064461
PCT Pub. Date: Jun. 22, 2006

(65) Prior Publication Data
US 2009/0271464 A1    Oct. 29, 2009

(30) Foreign Application Priority Data
Dec. 17, 2004   (EP) ................... 04300918

(51) Int. Cl.
*G06F 7/38* (2006.01)
(52) U.S. Cl. ..................................... 708/534
(58) Field of Classification Search ........... None
See application file for complete search history.

(56) References Cited

U.S. PATENT DOCUMENTS

| | | | | |
|---|---|---|---|---|
| 3,805,039 A | * | 4/1974 | Stiffler | 714/3 |
| 4,641,275 A | * | 2/1987 | Hatakeyama et al. | 712/9 |
| 6,038,652 A | * | 3/2000 | Phillips et al. | 712/22 |
| 7,003,653 B2 | * | 2/2006 | Spracklen | 712/300 |
| 2002/0062331 A1 | | 5/2002 | Abdallah et al. | |
| 2003/0088603 A1 | | 5/2003 | Wallace | |
| 2004/0073590 A1 | * | 4/2004 | Bhanot et al. | 708/534 |
| 2004/0133617 A1 | * | 7/2004 | Chen et al. | 708/523 |

FOREIGN PATENT DOCUMENTS

| | | |
|---|---|---|
| EP | 1308835 A2 | 5/2003 |
| JP | 01-147767 A | 6/1989 |
| JP | 06-309285 A | 11/1994 |
| JP | 11-066033 A | 3/1999 |
| WO | 0175587 A2 | 10/2001 |

OTHER PUBLICATIONS

Inoue, T; et al "An Area-Effective Datapath Architecture for Embedded Microprocessors and Scalable Systems" IEICE Transactions on Electronics, Electronics Society, vol. E84-C, No. 8, Aug. 2001, pp. 1014-1020.

* cited by examiner

Primary Examiner — David H Malzahn (57) ABSTRACT

A method of computing at least a first and a second tree of arithmetic or logical operations on a microprocessor comprising at least n parallel processing elements. The method comprises: a) executing (in 48) n arithmetic or logical operations of a first iteration of the first tree in parallel using the n processing elements, then b) executing (in 66) m arithmetic or logical operations in parallel between the results of the first iteration, using m processing elements chosen from the n processing element used for the computation of the first iteration, the other n−m processing element being unused for the computation of the second iteration. In parallel with the computation of the second iteration of the first tree, the method comprises executing (in 66) k arithmetic or logical operations of the second tree in parallel using k processing elements chosen from the n−m processing elements unused for the computation of the second iteration of the first tree.

12 Claims, 6 Drawing Sheets

ARITHMETIC OR LOGICAL OPERATION TREE COMPUTATION

FIELD OF THE INVENTION

The present invention relates to an arithmetic or a logical operation tree computation.

BACKGROUND OF THE INVENTION

A tree of arithmetic or logical operations is composed of arithmetic or logical operations organized according to a tree structure. The tree structure includes a plurality of nodes, each node having at least two inputs and one output. Each node corresponds to an arithmetic or logical operation between data received on its input and offers the result of the arithmetic or logical operation on its output.

The tree structure may be divided into successive levels:
  a first level composed of leaf nodes,
  several intermediate levels, each intermediate level being composed of nodes having inputs directly connected to the outputs of nodes of the same preceding level, and
  a root level having a root node.

The computation of such a tree of operations requires a plurality of iterations. During an iteration all the operations corresponding to nodes of a same level are executed.

Typically, a method of computing at least a first tree and a second tree of arithmetic or logical operations on a microprocessor comprising at least n parallel processing elements includes:

a) executing n arithmetic or logical operations of a first iteration of the first tree in parallel using the n processing elements, then
  b) executing m arithmetic or logical operations in parallel between the results of the first iteration, using m processing elements chosen from the n processing elements used for the computation of the first iteration, the other n−m processing element being unused for the computation of the second iteration, where m is an integer strictly smaller than n.

Once the first operation tree has been computed, the processing elements are configured to process, in a similar way, the second operation tree.

This is an ineffective way of using a microprocessor having parallel processing elements because during the computation of the second iteration of the first operation tree, some processing elements remain unused.

An example of a microprocessor comprising n parallel processing elements is described in U.S. 2003/0088603 by Andrew Paul Wallace.

SUMMARY OF THE INVENTION

Accordingly, it is an object of the invention to provide a method of computing at least a first and a second operation tree which uses in a more effective way a microprocessor having a plurality of parallel processing elements.

The invention provides a method of computing at least a first and a second operation tree on such a microprocessor, wherein in parallel with the computation of the second iteration of the first tree, the method comprises executing k arithmetic or logical operations of the second tree in parallel using k processing elements chosen from the n−m processing elements unused for the computation of the second iteration of the first tree, where k is an integer smaller than or equal to n−m.

In the above method, the n−m unused processing elements for an iteration of the first operation tree are used to compute arithmetic or logical operations of the second operation tree in parallel. Therefore, the number of processing elements used in parallel and the number of operations executed in parallel is increased. Thus, the use of the microprocessor comprising a plurality of parallel processing elements is more effective.

The features of executing data transfers between processing elements preceding the computation of the second iteration of the first tree and data transfer preceding the execution of the k arithmetic or logical operations of the second tree in parallel reduce the amount of processing time because during the time necessary for transferring data between the m processing elements, the data between the k processing elements are also transferred in parallel.

The features of interleaving each processing element used for the computation of the second tree between two processing elements used for the computation of the second iteration of the first tree reduce the data transfer time between processing elements.

The invention also relates to a memory and a microprocessor program having instructions for the execution of the above method.

The invention also relates to a de-spreading method in a telecommunication device using the above method for computing at least a first and a second tree of identical arithmetic or logical operations.

DESCRIPTION OF THE PREFERRED EMBODIMENTS

Figure 1:
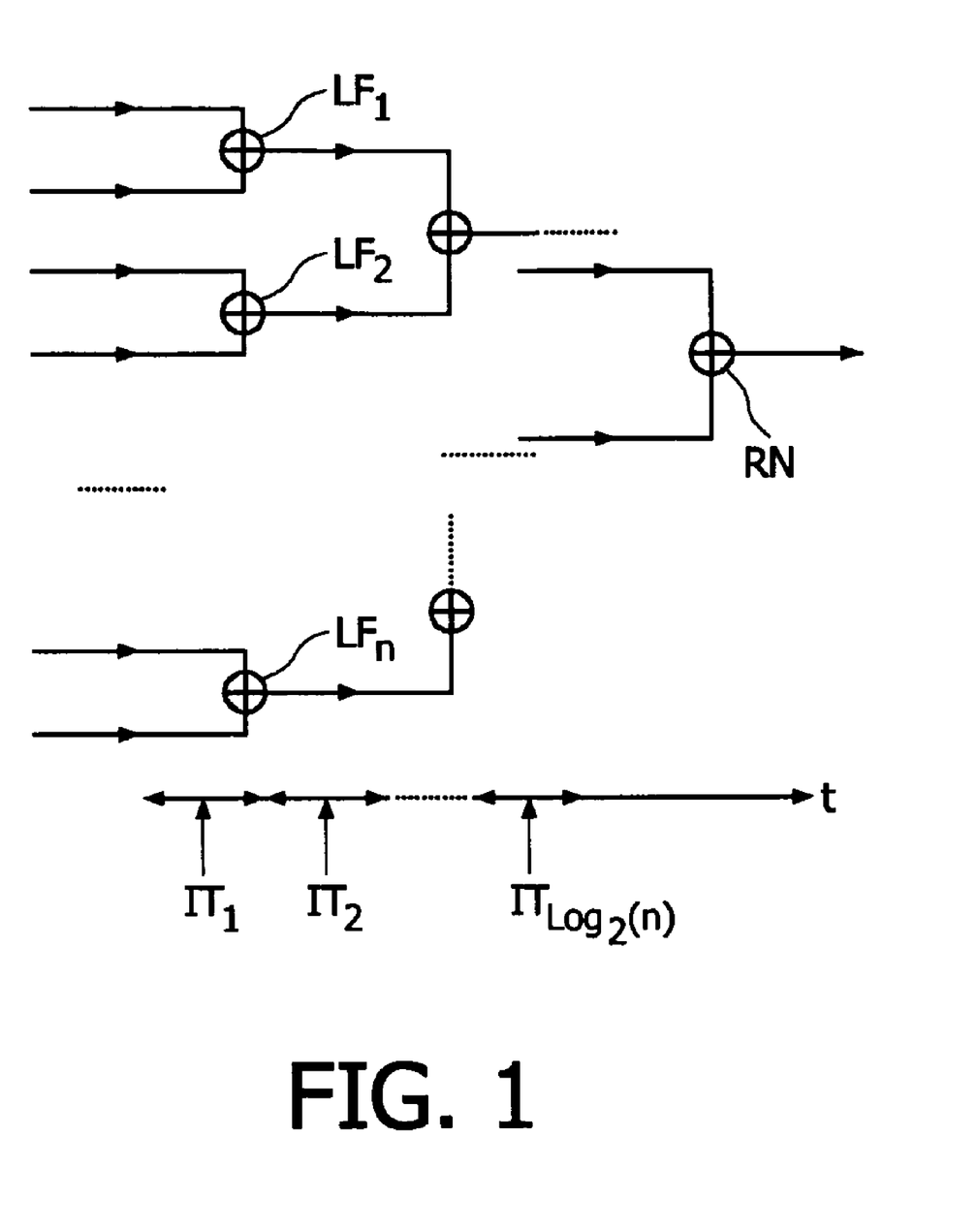
FIG. 1 is a schematic diagram of an exemplary operation tree.

FIG. 1 shows an example of an operation tree 2. For instance, in FIG. 1, the nodes are organized in parallel vertical rows, each row corresponding to a level of the operation tree. The row at the very left of FIG. 1 includes all leaf nodes LFi and the row at the very right of FIG. 1 only includes a root node RN.

Each leaf node LFi has two inputs intended to receive data to be processed. The outputs of two leaf nodes LFi are connected to the inputs of a node of the following row. The outputs of the nodes of the following row are connected to the inputs of the next following row in a similar way. This way of connecting the nodes of one row to the nodes of the following row is repeated until the root row having root node RN is reached.

Here, operation tree 2 is a binary tree sum and each node corresponds to an addition between the two inputted data. For example, operation tree 2 is used to compute the addition of a great number of data like the chip values of each chip of a spread signal in a CDMA (Code Division Multiple Access) telecommunication system.

The computation of operation tree 2 requires a plurality of iterations ITi. During the first iteration IT1 the arithmetic or logical operations of leaf nodes LFi are executed. Then, during the following iteration IT2, the operations corresponding to the nodes of the second row from the left are executed. This process is repeated until the operation corresponding to root node RN is executed.

For example, if the number n of inputted data in operation tree 2 is equal to 256, then operation tree 2 is computed in eight iterations. The number of additions executed during iterations IT1 to IT8 is 128, 64, 32, 16, 8, 4, 2 and 1, respectively.

Figure 2:
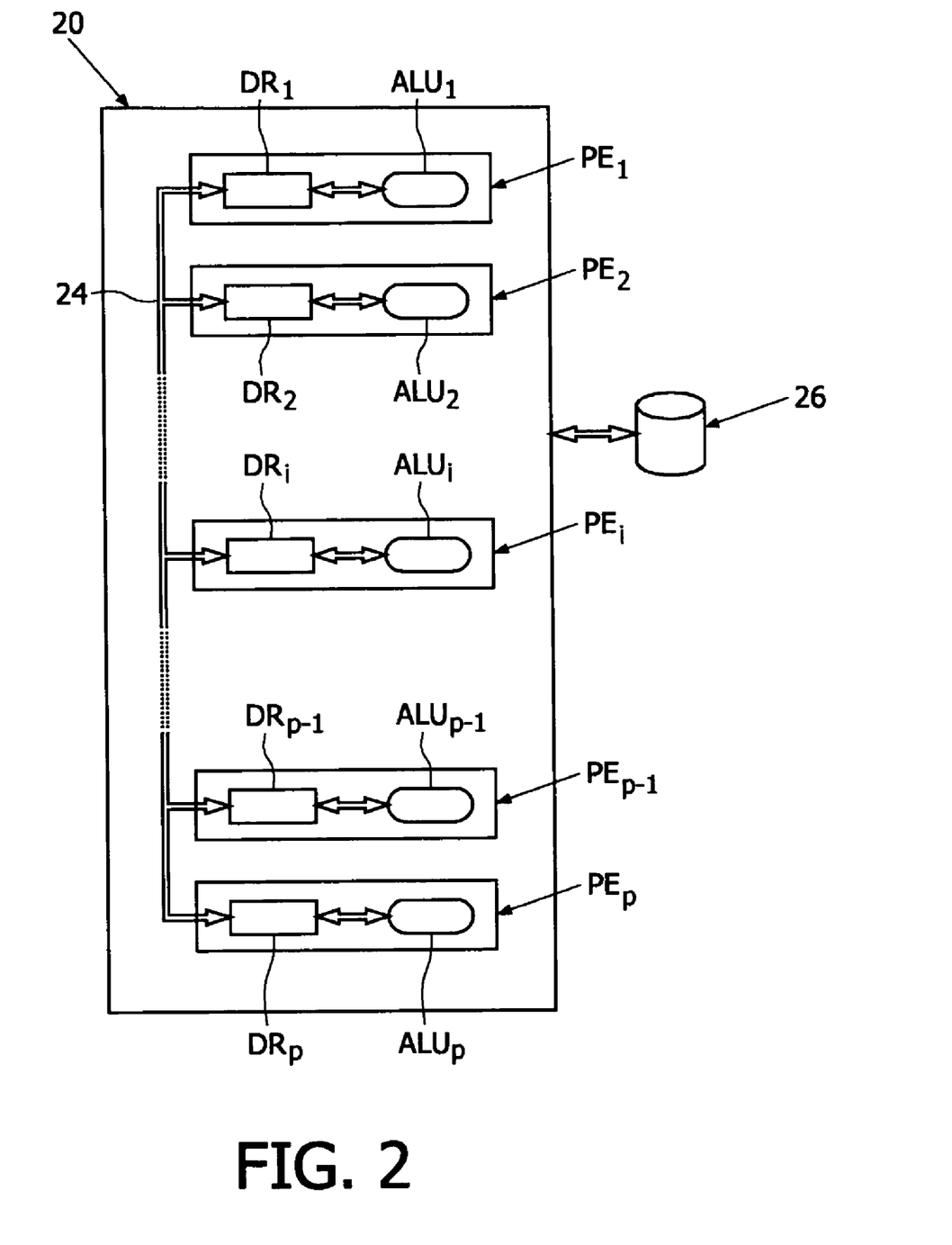
FIG. 2 is a schematic diagram of a SIMD (Single Instructions Multiple Data) microprocessor used to compute the operation tree of FIG. 1.

FIG. 2 shows a SIMD (Single Instruction Multiple Data) microprocessor 20 used to compute operation tree 2. SIMD microprocessors are particularly well-suited for executing the same processing at the same time on a large number of data.

For simplicity, FIG. 2 shows only the details necessary to understand the invention.

Microprocessor 20 includes a number p of parallel processing elements PEi. For example, p is equal to 4086 and index i is an integer number ranging from 1 to 4086. All the processing elements PEi are designed to execute the same program in parallel on a different set of data. Therefore, each processing element has an ALU (Arithmetic and Logic Unit) to execute an arithmetical or logical operation and a data register DRi to store the data to be processed by the ALU and the result of this processing. For instance, data register DRi can store up to 192 bits.

Only five processing elements PE1, PE2, PEi, Pep-1 and PEp are shown in FIG. 2.

The processing elements of microprocessor 20 are connected to each other by an interconnection network 24 so that data stored in one data register DRi can be transferred to another data register DRj of another processing element PEj. Each data register DRi has an address on network 24 used during data transfer.

Processing elements PEi are manufactured on the same silicon die or substrate.

Microprocessor 20 is easy to use because the same program applies to all processing elements and all processing elements execute the same instructions at the same time. The program is stored in a memory 26 connected to microprocessor 20.

Memory 26 includes instructions for the execution of the method of FIG. 2 when microprocessor 20 executes these instructions.

The method of computing at least two operation trees like operation tree 2 on microprocessor 20 will now be described with reference to FIGS. 3 to 6 in the particular case of the processing of eight identical binary tree sums A, B, C, D, E, F, G, H, in parallel. For instance, the method described below is part of a de-spreading method implemented in a telecommunication device.

Figure 3:
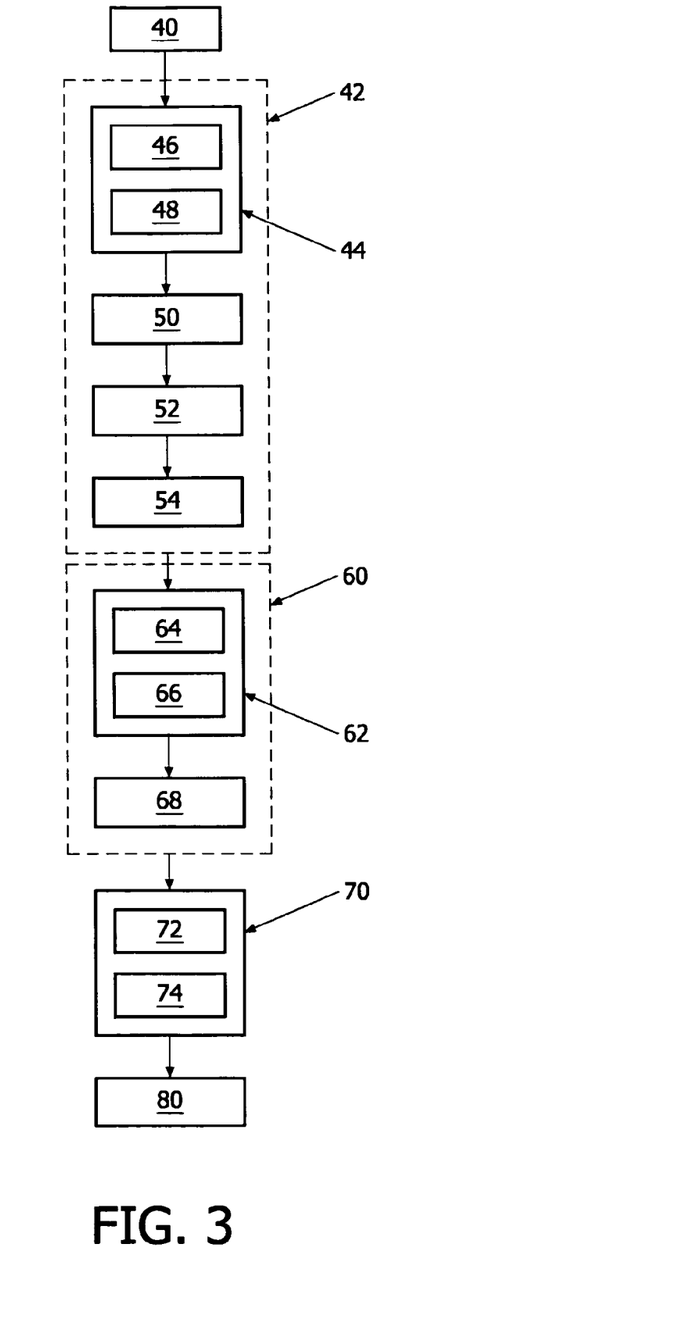
FIG. 3 is a flowchart of a method of computing eight operation trees like the one of FIG. 1 in parallel using the microprocessor of FIG. 2.

Each binary tree sum A to H has 256 data inputs, each data being a bit representing either a logical zero or a logical one.

Furthermore, the method of FIG. 3 is described in the particular case where only the first 256 processing elements PEi of microprocessor 20 are used to compute the eight binary tree sums A to H.

Initially, in step 40, each input data of each binary tree sum is stored in one of the data registers DRi of microprocessor 20. For example, the input data Ai, Bi, Ci, Di, Ei, Fi, Gi and Hi of binary tree sums A, B, C, D, E, F, G and H, respectively, are stored in data register DRi. As a result, data A1, B1, C1, D1, E1, F1, G1 and H1 are stored in data register DR1 of the first processing element PE1 and data A256, B256, . . . and H256 are stored in data register DR256 of the last processing element PE256 used to compute binary tree sums A to H.

Subsequently, during a phase 42, the first iteration of each binary tree sum is computed.

More precisely, in step 44, processor 20 computes the first iteration of binary tree sums A and B in parallel using processing elements PE1 to PE256.

During step 44, microprocessor 20 transfers data A2$j$ to data register DR2 (j−1)+1 and data B2 (j−1)+1 to data register DR2$j$, where index j is an integer ranging from 1 to 128. These transfer operations are executed using only two instructions: one for moving all data A2$j$ and one for moving all data B2 (j−1)+1.

Only two transfer instructions are needed because data Ai and Bi are both recorded in data register DRi.

Figure 4A:
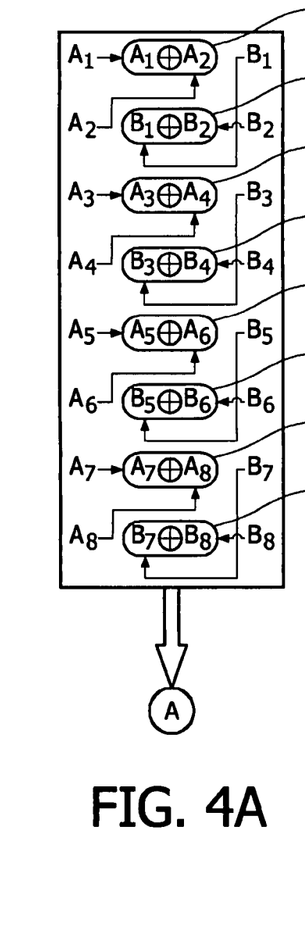
FIGS. 4A-4D, 5A-5B, and 6 are illustrations of the steps of the method of FIG. 3.
Figure 4B:
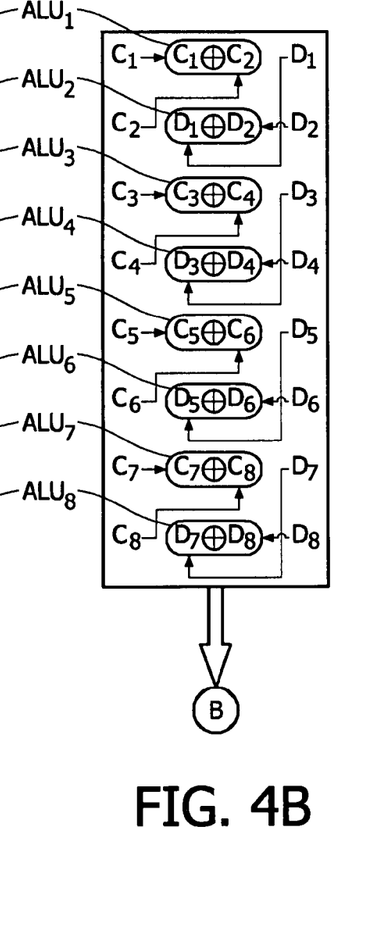
Figure 4C:
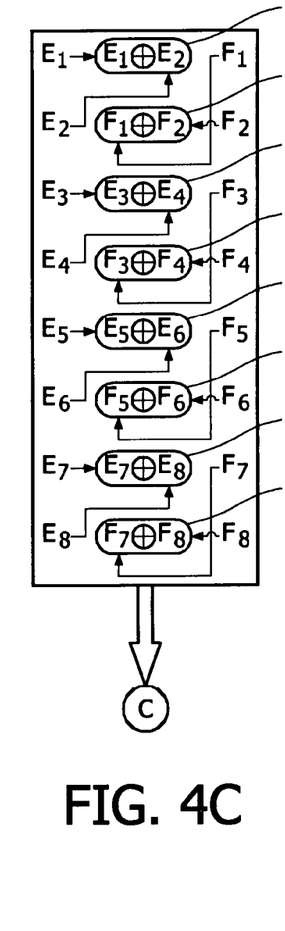
Figure 4D:
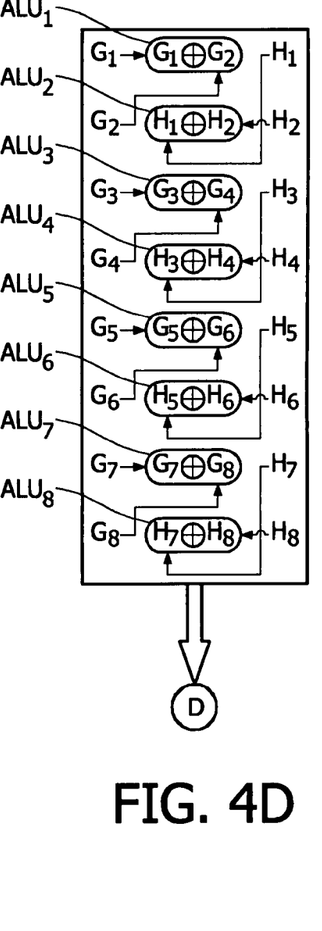

FIG. 4A illustrates the data transfers that take place between data register DR1 to DR8. In FIG. 4A, as well as in FIGS. 4B-4D and 5A-5B and 6, the elements of microprocessor 20 have the same references as in FIG. 2.

The arithmetic or logical operation to be executed is represented within each symbol ALUi, i.e., an addition. The relevant data stored in data register DRi corresponding to ALUi are represented on the left and right sides of ALUi. Arrows with vertical parts from a data in a data register DRi to an ALUk indicate how this data must be moved before executing an arithmetic or logical operation using ALUk. For example, in FIG. 4A, data B1 is connected by an arrow having a vertical part to ALU2. This means that data B1 has to be transferred to data register DR2 before executing an addition using ALU2. In FIG. 4A, the horizontal arrow from data A1 to ALU1 indicates that data A1 is already stored in data register DR1.

Once data have been transferred during operation 48, the processing element PE2(j−1)+1 executes the addition of data A2(j−1)+1 and A2$j$ and stores the result AA2(j−1)+1 in data register DR2(j−1)+1.

In parallel, during operation 48, processing element PE2$j$ executes the addition of data B2$j$ and B2(j−1)+1 and stores the result BB2$j$ in data register DR2$j$.

Therefore, during operation 48, all the 256 processing elements PEi are simultaneously used.

Next, the first iteration of binary tree sums C and D, E and F, G and H are computed in steps 50, 52 and 54, respectively. Each step 50, 52 and 54 is similar to step 44 except that letters A and B are replaced by, respectively:
C and D in step 50,
E and F in step 52, and
G and H in step 54.

Thereafter, in phase 60, the second iteration of each binary tree sums A to H is computed.

In step 62, the second iteration of binary tree sums A to D is computed in parallel. More precisely, during operation 64, the following data are transferred:
result AA2$j$+1 is transferred to data register DR2(j−1)+1,
result BB2(j+1) is transferred to data register DR2$j$,
result CC2(j−1)+1 is transferred to data register DR2$j$+1, and
result DD2$j$ is transferred to data register DR2(j+1).

Figure 5A:
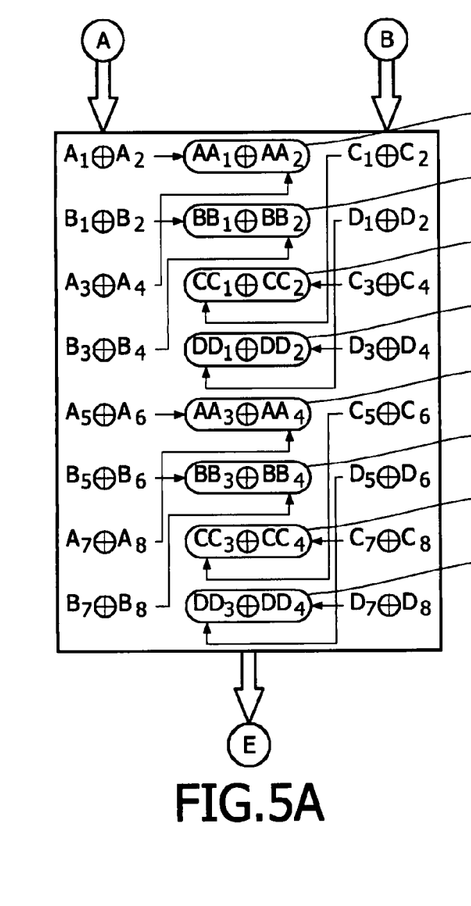
Figure 5B:
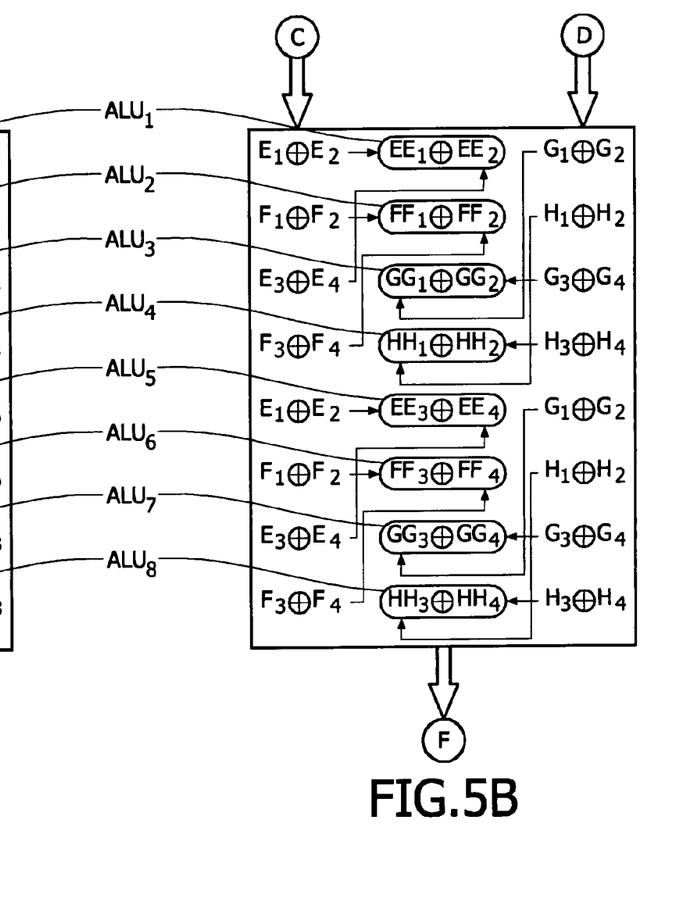

These data transfers are illustrated by arrows pointing downwards in FIG. 5A.

Then, during operation 66, the following additions are executed in each processing element Pei in parallel:
processing element PE2(j−1)+1 adds result AA2(j−1)+1 to result AA2$j$+1 and stores the result AAA2(j−1)+1 in data register DR2(j−1)+1
processing element PE2$j$ adds result BB2(J+1) to result BB2$j$ and stores the result BBB2$j$ in data register DR2$j$, processing element PE$2j$+1 adds result CC$2(j-1)$+1 to result CC$2j$+1 and stores the result CCC$2j$+1 in data register DR$2(j+1)$, and processing element PE$2(j+1)$ adds result DD$2j$ and result DD$2(j+1)$ and stores the result DDD$2(j+1)$ in data register DR$2(j+1)$.

Thereafter in step 68, the second iterations of binary tree sums E, F, G and H are computed in parallel. Step 68 is similar to step 62 except that letters A, B, C, D are replaced by letters E, F, G, H, respectively. The data transfer that takes place in step 68 is illustrated by arrows pointing downwards in FIG. 5B.

In steps 62 and 68 the 256 processing elements PE$i$ are used in parallel.

Next, in step 70, the third iterations of binary tree sums A to H are computed in parallel. First, during an operation 72, a data transfer of the results of the second iterations takes place and then, during an operation 74, the additions of the third iteration of each binary tree sum are executed.

During operation 72, the results of the second iteration are transferred as follows:

result AAA$2(j+1)$+1 is transferred to data register DR$2(j-1)$+1, result BBB$2(j+2)$ is transferred to data register DR$2j$, result CCC$2(j+2)$+1 is transferred to data register DR$2j$+1, result DDD$2(j+3)$ is transferred to data register DR$2(j+1)$, result EEE$2(j-1)$+1 is transferred to data register DR$2(j+1)$+1, result FFF$2j$ is transferred to data register DR$2(j+2)$ result GGG$2j$+1 is transferred to data register DR$2(j+2)$+1, and result HHH$2(j+1)$ is transferred to data register DR$2(j+3)$.

During operation 74, the following additions are executed in parallel:

processing element PE$2(j-1)$+1 adds result AAA$2(j+1)$+1 to result AAA$2(j-1)$+1 and stores the result AAAA$2(j-1)$+1 in data register DR$2(j-1)$+1, processing element PE$2j$ adds result BBB$2(j+2)$ to result BBB$2j$ and stores the result BBBB$2j$ in data register DR$2j$, processing element PE$2j$+1 adds result CCC$2(j+2)$+1 to result CCC$2j$+1 and stores the result CCCC$2j$+1 in data register DR$2j$+1, processing element PE$2(j+1)$ adds result DDD$2(j+3)$ to result DDD$2(j+1)$ and stores the result DDDD$2(j+1)$ in data register DR$2(j+1)$, processing element PE$2(j+1)$+1 adds result EEE$2(j-1)$+1 to result EEE$2(j+1)$+1 and stores the result EEEE$2(j+1)$+1 in data register DR$2(j+1)$+1, processing element PE$2(j+2)$ adds result FFF$2j$ to result FFF$2(j+2)$ and stores the result FFFF$2(j+2)$ in data register DR$2(j+2)$, processing element PE$2(j+2)$+1 adds result GGG$2j$+1 to result GGG$2(j+2)$+1 and stores the result GGGG$2(j+2)$+1 in data register DR$2(j+2)$+1, and processing element PE$2(j+3)$ adds result HH$2(j+1)$ to result HHH$2(j+3)$ and stores the result HHHH$2(j+3)$ in data register DR$2(j+3)$.

Therefore, during operation 24, all the 256 processing elements PE$i$ are used simultaneously.

Figure 6:
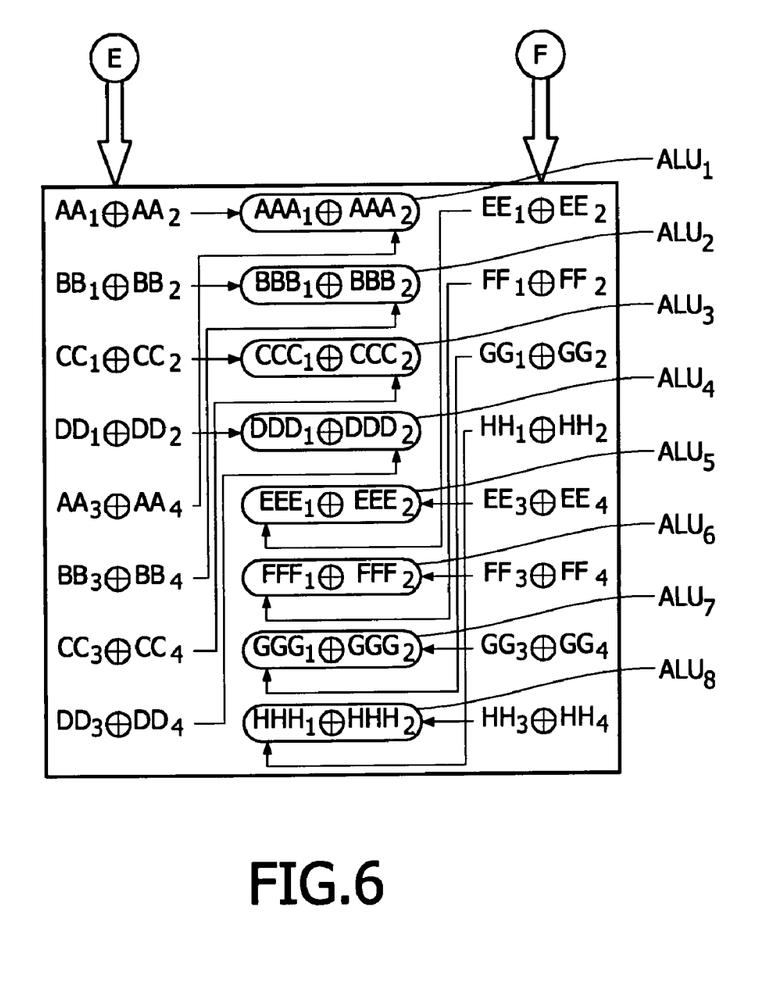

The data transfers that take place during operation 72 are illustrated by arrows pointing downwards in FIG. 6.

In step 80, the next iterations of each binary tree sum A to H are computed in parallel. At this stage, the number 256 of processing elements is greater than the number of parallel additions to be executed. Thus the computation of the 4th to the 8th iteration of each binary tree sum does not need to be described in detail. In fact, to compute the 4th iterations of the eight binary tree sums A to H in parallel, only 128 processing elements PE$i$ are needed, which is less than the 256 processing elements that were allocated at the beginning to compute the eight binary tree sums.

In the method of FIG. 3, some processing elements PE$i$ first allocated to the computation of the first iteration of binary tree sum A, are then used to compute, in parallel, the iterations of another binary tree sum during the computation of the second and third iterations of binary tree sum A. For example, processing element PE3 is used to compute the first iteration of binary tree sum A and to compute the second iteration of binary tree sum C during the computation of the second iteration of binary tree sum A. Processing element PE3 is also used to compute the third iteration of binary tree sum C during the computation of the third iteration of binary tree sum A.

Therefore, in the particular embodiment described here, all the processing elements PE$_1$ to PE$_{256}$ are fully used during phases 42 and 60 and during step 70. The computation of the eight binary tree sums is therefore faster due to the mixing or interleaving of operations from different operation trees.

The processing elements used to compute a first and a second operation tree, for example binary tree sums A and B, are interleaved. This means that each processing element, except the first and last processing element PE1 and PE256, used for the computation of the first tree is positioned between two processing elements used for the computation of the second tree. Such a feature decreases the amplitude of data transfers and results in a faster processing.

Many additional embodiments are possible. For example, the method is not limited to the computation of a plurality of binary tree sums in parallel and applies more generally to operation trees in which each node is an arithmetic or logical operation that can be executed by an ALU in response to one instruction. For example, each node can be designed to compute an X-OR operation or a subtraction.

SIMD microprocessors are only designed to execute one instruction in parallel on a plurality of data. Therefore, the above method can only be used to compute a plurality of identical operation trees in parallel when executed on an SIMD microprocessor. However, such a limitation does not exist if the method is implemented on a MIMD (Multiple Instruction Multiple Data) microprocessor. Therefore, if implemented on a MIMD microprocessor, the method can be used to compute different operation trees in parallel. For instance, a binary tree sum and a binary tree subtraction can be computed simultaneously.

The above method is not limited to binary trees with nodes having two inputs. For example, it also applies to operation trees having nodes with more than two inputs.

The invention claimed is:

1. A method of computing at least a first and a second tree of arithmetic or logical operations on a microprocessor comprising at least n parallel processing elements to execute n arithmetic or logical operations in parallel, each of the at least the first and the second tree of arithmetic or logical operations composed of arithmetic or logical operations organized according to a tree structure, the computation of each tree requiring a plurality of successive iterations, the result of each iteration being used during the computation of the next iteration, where n is a positive integer greater than four, the method comprising:

executing n arithmetic or logical operations of a first iteration of the first tree in parallel using the n processing elements, then executing m arithmetic or logical operations in parallel to the results of the first iteration, using m processing elements chosen from the n processing elements used for the computation of the first iteration, the other n−m processing element being unused for the computation of a second iteration, where m is an integer strictly smaller than n, wherein in parallel with the computation of the second iteration of the first tree, the method comprises executing k arithmetic or logical operations of the second tree in parallel using k processing elements chosen from the n−m processing elements unused for the computation of the second iteration of the first tree, where k is an integer smaller than or equal to n−m.

2. The method according to claim 1, wherein data transfers between processing elements preceding the computation of the second iteration of the first tree are executed in parallel with data transfer preceding the execution of the k arithmetic or logical operations of the second tree.

3. The method according to claim 1, wherein each processing element used for the computation of the second tree is interleaved between two processing elements used for the computation of the second iteration of the first tree.

4. The method according to claim 1, wherein the microprocessor comprising the at least n parallel processing elements to execute n arithmetic or logical operations in parallel is a Single Instructions Multiple Data (SIMD) microprocessor comprising p identical processing elements to execute p identical arithmetic or logical operations in parallel, wherein p is an integer that is greater than or equal to n, and wherein the processing elements is manufactured on a common die.

5. De-spreading method in a telecommunication device comprising the step of computing at least a first and a second binary tree sum, each of the at least the first and the second binary tree sum composed of addition operations organized according to a tree structure, wherein at least the first and the second binary tree sum are computed on the microprocessor comprising the at least n parallel processing elements using a computational method according to claim 1.

6. The method of claim 5, wherein each of the at least a first and a second binary tree sum is exclusively composed of addition operations organized according to a tree structure.

7. Memory comprising instructions for the execution of a method of computing a first and a second tree of arithmetical or logical operations according to claim 1, when these instructions are executed on the microprocessor comprising the at least n parallel processing elements.

8. Microprocessor program comprising instructions for the execution of a method of computing at least a first and a second tree of arithmetic or logical operations according to claim 1, when these instructions are executed on the microprocessor comprising the at least n parallel processing elements.

9. The method of claim 1, wherein executing the m arithmetic or logical operations in parallel to the results of the first iteration, using the m processing elements chosen from the n processing elements used for the computation of the first iteration comprises executing the m arithmetic or logical operations of the second iteration of the first tree in parallel to the results of the first iteration, using the m processing elements chosen from the n processing elements used for the computation of the first iteration.

10. The method of claim 1, wherein each of the arithmetic or logical operations of the at least a first and a second tree is executed by the microprocessor in response to one instruction.

11. The method of claim 10, wherein each of the arithmetic or logical operations of the at least a first and a second tree is an X-OR operation or a subtraction.

12. The method of claim 1, wherein all the processing elements of the microprocessor are used during the execution of the first tree and the execution of the second tree.

* * * * *